(12) United States Patent
Jain et al.

(10) Patent No.: US 9,754,552 B2
(45) Date of Patent: Sep. 5, 2017

(54) ARCHITECTURES FOR PROCESSING OF HEAD TRACKING ON A MOBILE DEVICE

(71) Applicant: Amazon Technologies, Inc., Reno, NV (US)

(72) Inventors: Kritarth Jain, Seattle, WA (US); Michal Marek Kozlowski, Seattle, WA (US); Michael Lee Sandige, Sammamish, WA (US); Andrew Bartlett Leonard, Seattle, WA (US); Paul Savastinuk, Shoreline, WA (US); Ross David Roessler, Seattle, WA (US); Geoffrey Scott Heller, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/307,284

(22) Filed: Jun. 17, 2014

(65) Prior Publication Data

US 2015/0364109 A1 Dec. 17, 2015

(51) Int. Cl.
  *G06F 3/01* (2006.01)
  *G09G 5/00* (2006.01)
  *G06F 3/038* (2013.01)
  *G06F 3/0346* (2013.01)

(52) U.S. Cl.
  CPC .............. *G09G 5/006* (2013.01); *G06F 3/011* (2013.01); *G06F 3/012* (2013.01); *G06F 3/017* (2013.01); *G06F 3/038* (2013.01); *G06F 3/0346* (2013.01); *G06F 2203/0383* (2013.01)

(58) Field of Classification Search
  CPC ....................................................... G06F 3/015
  See application file for complete search history.

(56) References Cited

U.S. PATENT DOCUMENTS

| | | | | |
|---|---|---|---|---|
| 8,620,774 | B1 * | 12/2013 | Li et al. ...................... | 705/27.1 |
| 2005/0073136 | A1 * | 4/2005 | Larsson et al. ............... | 280/735 |
| 2007/0266392 | A1 * | 11/2007 | Thoelke ................... | G06F 9/542 |
| | | | | 719/313 |

(Continued)

OTHER PUBLICATIONS

Huang, Jim, "Android IPC Mechanism", Mar. 19, 2012, http://www.dre.vanderbilt.edu/~schmidt/cs282/PDFs/android-binder-ipc.pdf.*

(Continued)

*Primary Examiner* — Patrick Edouard
*Assistant Examiner* — Matthew Yeung
(74) *Attorney, Agent, or Firm* — Polsinelli LLP

(57) ABSTRACT

A tracking architecture is provided that enables data for gestures and head positions to be provided to both native and non-native clients on a computing device. A pipeline component can obtain the raw image data and sensor data and synchronize that data to be processed to determine, for example, location and/or motion data that may correspond to device input. The data can be processed by separate components, such as an event publisher and an event provider, each capable of filtering the location, motion, and/or raw sensor data to generate a set of event data. The event data then can be published to registered listeners or provided in response to polling requests. Head coordinates, gesture data, and other such information can be passed through one or more interface layers enabling the data to be processed by a non-native client on the device.

21 Claims, 8 Drawing Sheets

(56) References Cited

U.S. PATENT DOCUMENTS

| | | | |
|---|---|---|---|
| 2008/0307436 A1* | 12/2008 | Hamilton | G06F 9/542 |
| | | | 719/318 |
| 2010/0125816 A1* | 5/2010 | Bezos | 715/863 |
| 2012/0163520 A1 | 6/2012 | Liu et al. | |
| 2012/0307086 A1* | 12/2012 | Jefremov | H04N 5/23258 |
| | | | 348/208.4 |
| 2013/0044241 A1* | 2/2013 | Zhou | H04N 5/23258 |
| | | | 348/241 |
| 2013/0086102 A1* | 4/2013 | Addala et al. | 707/769 |
| 2013/0329023 A1 | 12/2013 | Suplee, III et al. | |
| 2014/0040653 A1 | 2/2014 | Etkin et al. | |
| 2014/0118305 A1* | 5/2014 | Jang et al. | 345/175 |

OTHER PUBLICATIONS

International Search Report and Written Opinion for International Patent Application PCT/US2015/035764, mailed Sep. 3, 2015, 17 pages.

\* cited by examiner

ARCHITECTURES FOR PROCESSING OF HEAD TRACKING ON A MOBILE DEVICE

BACKGROUND

As users are increasingly relying on portable computing devices for a variety of tasks, it is desirable to improve the ways in which users can interact with, and control, these devices. As the ability for a user to interact with such a device changes, however, there is a corresponding need to improve the way in which information for the interaction is managed and propagated to applications and services that consume that information.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to obtaining data regarding user input and actions and propagating that information to applications and processes executing on an electronic device. In particular, various embodiments provide architectures that enable data for gestures, head movements, and other motions and/or actions to be managed and provided to various clients. The architecture can accept data from components such as cameras and motion sensors, and can analyze that data to determine information such as relative head locations, user gestures, and device rotations. The architecture can also utilize various filters to smooth the data in order to improve reliability. The architecture can expose the data using both pull and push approaches, for example, which can be provided for both native and non-native clients. Separate management components can be used for different types of inputs, such as user gestures, head movements, and device rotations. The architecture can also synchronize data from different sources in order provide for improved correlation of the input data.

Various other functions and advantages are described and suggested below as may be provided in accordance with the various embodiments.

Figure 1A:
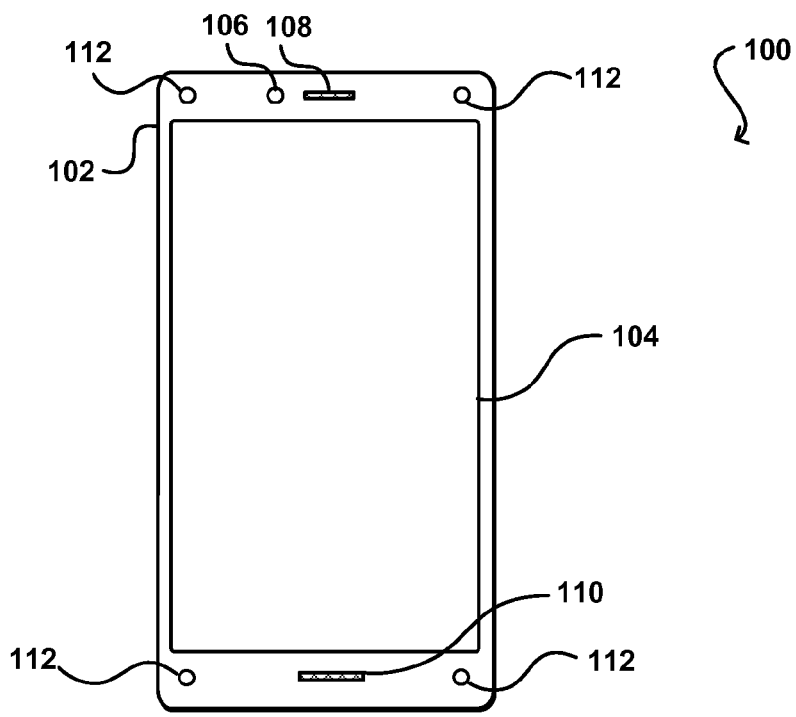
FIGS. 1(a) and 1(b) illustrate an example portable computing device that can utilize aspects of the various embodiments.
Figure 1B:
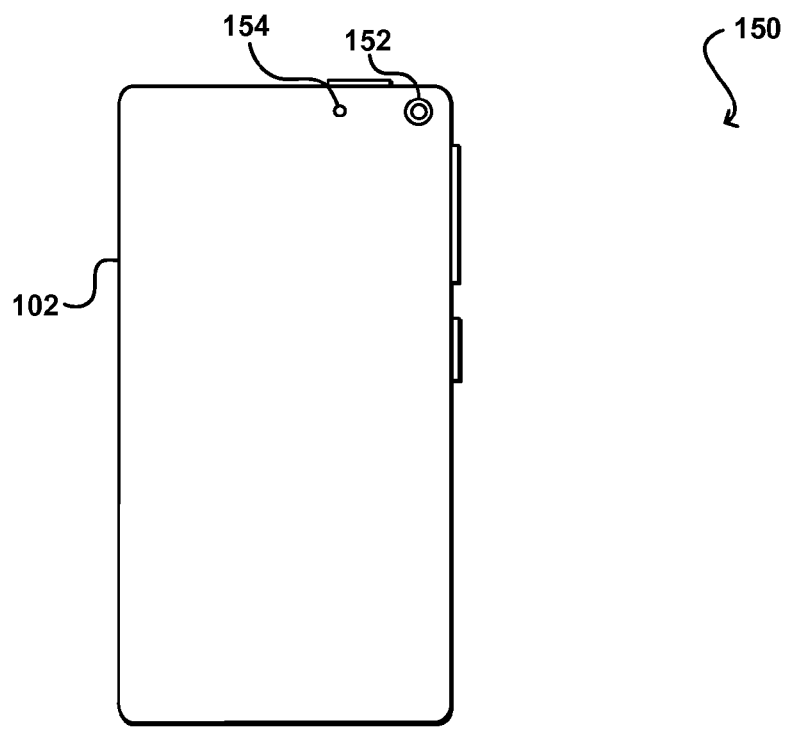
Figure 2A:
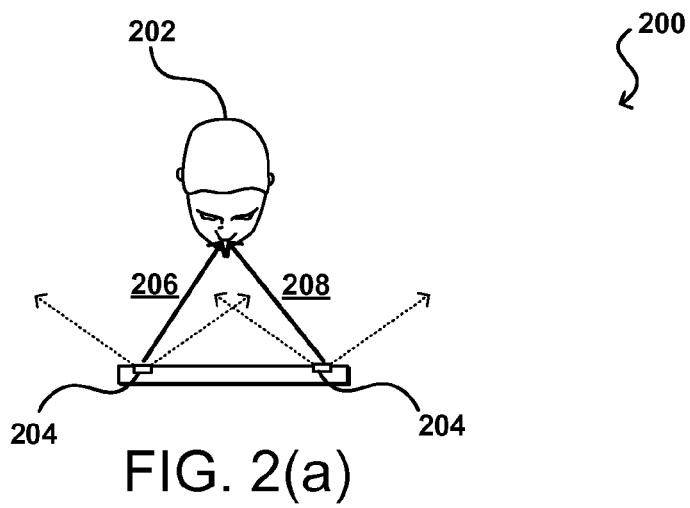
FIGS. 2(a), 2(b), 2(c), 2(d), and 2(e) illustrate an example head tracking approach that can be utilized in accordance with various embodiments.
Figure 2B:
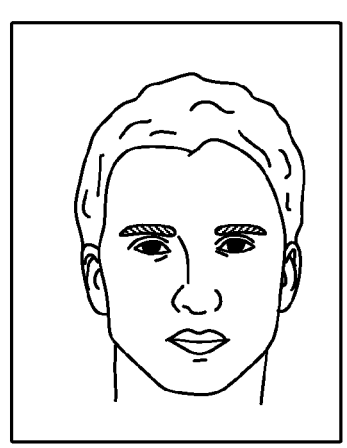
Figure 2C:
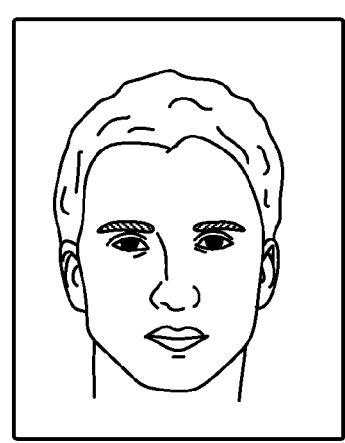
Figure 2D:
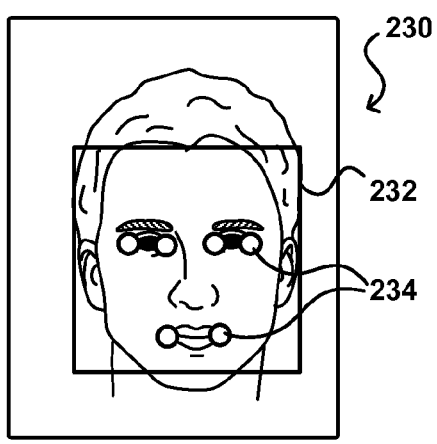
Figure 2E:
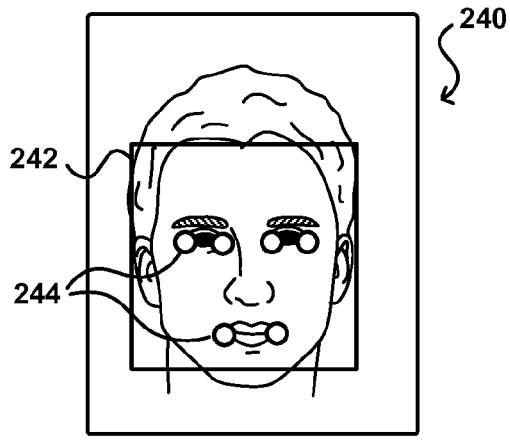

FIGS. 1A and 1B illustrate front and back views, respectively, of an example portable computing device that can take advantage of various embodiments discussed and suggested herein. Although a smart phone is shown, it should be understood that there can be various types of electronic devices that can advantageously utilize aspects of the various embodiments, as may include tablet computers, phablets, electronic book readers, desktop computers, notebook computers, personal data assistants, video gaming consoles, television set top boxes, smart televisions, wearable computers (e.g., smart watches and glasses), portable media players, and digital cameras, among others.

As illustrated in the front view 100 of FIG. 1A, the example smart phone 100 has a display screen 104 on the front side, which under normal operation will display information to a user facing the display screen (e.g., on the same side of the computing device as the display screen). The display screen is typically a touch-sensitive screen, allowing for touch or gesture input, and the display screen 104 can be flush with, or recessed from, the device casing 102 or housing. The housing is typically plastic, although materials such as aluminum, polymers, metal, and glass are used in various devices. The device has a main, front-facing camera 106 which will generally be the primary camera used for taking pictures and/or video of the user during operation. The front-facing camera 106 can generally be a full color, high resolution camera, such as a camera that has 4 megapixel resolution or greater, along with at least 8 bit color depth. The example device also includes a set of relatively low resolution, panchromatic gesture cameras 112, although cameras with capabilities similar to, or even exceeding, the front-facing camera can be used as well within the scope of the various embodiments, among other such possibilities. The gesture cameras can be panchromatic and utilize lower resolution (e.g., 3 MP or less) as the gesture cameras can be used for processes such as head tracking and user identification, which can be performed with adequate results using such cameras. The lower resolution, lower color cameras generally are cheaper and require less resources to operate and analyze than cameras such as the front-facing camera. Each camera, or other image capture element, may be, for example, a charge-coupled device (CCD), a CMOS device, a motion detection sensor, or an infrared sensor, among other such possibilities. There can also be fewer or additional cameras, in similar or different locations and of similar or different types, within the scope of the various embodiments. In some embodiments, at least one imaging element can include at least one wide-angle optical element, such as a fish-eye lens, that enables the camera to capture images and/or image data over a wide range of angles, such as 180 degrees or more. Further, each image capture element can comprise a digital still camera, configured to capture subsequent frames in rapid succession, and/or a video camera able to capture video, such as streaming video. The gesture cameras 112 can be used in pairs to function as stereoscopic cameras, which can be used to determine depth or disparity information, such as may be useful in generating a depth map for an object represented in an image captured by the stereoscopic ("stereo") camera.

The example computing device include at least one microphone 110 or other audio capture device capable of capturing audio data, such as words or commands spoken by a user of the device, music playing near the device, etc. In this example, a microphone is placed on the same side of the device as the display screen, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc. The device also can include at least one speaker 108 for playing audio, such as music, a phone conversation, and the like. As illustrated in the back view 150 of FIG. 1B, the smart phone might also include a back-facing camera 152 for capturing images from the back side of the device. This camera will generally have at least the same capabilities as the front-facing camera, and in many embodiments may have higher resolution. The device can include other components for assisting with image capture and acquisition as well, such as a light sensor 154 for determining an amount of ambient light near the device, a flash element (not shown), and other such components.

The availability of various components on such devices enables additional and/or improved approaches for interacting with these devices. For example, a device might render information on a display screen based on where the user is with respect to the device. The device also might power down if a user's head is not detected within a period of time. A device also might accept device motions as input as well, such as to display additional information in response to a moving of a user's head or tilting of the device. These input mechanisms can thus depend upon information from various cameras or sensors to determine things like motions, gestures, and head movement.

In one example, the relative direction of a user's head can be determined using one or more images captured using a single camera. In order to get the position in three dimensions, it can be necessary to determine the distance to the head as well. While an estimate can be made based upon feature spacing viewed from a single camera, for example, it can be desirable in many situations to obtain more accurate distance information. One way to determine the distance to various features or points is to use stereoscopic imaging, or three-dimensional imaging, although various other distance or depth determining processes can be used as well within the scope of the various embodiments. For any pair of cameras that have at least a partially overlapping field of view, three-dimensional imaging can be performed by capturing image information for one or more objects from two different perspectives or points of view, and combining the information to produce a stereoscopic or "3D" image. In at least some embodiments, the fields of view can initially be matched through careful placement and calibration, such as by imaging using a known calibration standard and adjusting an optical axis of one or more cameras to have those axes be substantially parallel. The cameras thus can be matched cameras, whereby the fields of view and major axes are aligned, and where the resolution and various other parameters have similar values for each of the cameras. Three-dimensional or stereoscopic image information can be captured using two or more cameras to provide three-dimensional point data, or disparity information, which can be used to generate a depth map or otherwise determine the distance from the cameras to various features or objects. For a given camera pair, a stereoscopic image of at least one object can be generated using the respective image that was captured by each camera in the pair. Distances measurements for the at least one object then can be determined using each stereoscopic image.

FIGS. 2(a) through 2(e) illustrate an example approach for determining the relative position of a user's head to a computing device. In the situation 200 illustrated in FIG. 2(a), a computing device includes a pair of stereo cameras 204 that are capable of capturing stereo image data including a representation of a head 202 of a user (or other person within a field of view of the cameras). Because the cameras are offset with respect to each other, objects up to a given distance will appear to be at different locations in images captured by each camera. For example, the direction 206 to a point on the user's face from a first camera is different from the direction 208 to that same point from the second camera, which will result in a representation of the face being at different locations in images captured by the different cameras. For example, in the image 210 illustrated in FIG. 2(b) the features of the user appear to be slightly to the right in the image with respect to the representations of corresponding features of the user in the image 220 illustrated in FIG. 2(c). The closer the features are to the cameras, the greater the offset between the representations of those features between the two images. For example, the nose, which is closest to the camera, may have the largest amount of offset, or disparity. The amount of disparity can be used to determine the distance from the cameras as discussed elsewhere herein. Using such an approach to determine the distance to various portions or features of the user's face enables a depth map to be generated which can determine, for each pixel in the image corresponding to the representation of the head, the distance to portion of the head represented by that pixel. As mentioned elsewhere, cameras used for aspects of the various embodiments can include an appropriate devices or sensors capable of capturing or acquiring data relating to a position, orientation, distance, or arrangement of one or more objects, as may include a CMOS sensor, infrared (IR) sensor, time-of-flight sensor, thermal imaging sensor, receiving sensor for light and/or sound, and the like.

Various approaches to identifying a head of a user can be utilized in different embodiments. For example, images can be analyzed to locate elliptical shapes that may correspond to a user's head, or image matching can be used to attempt to recognize the face of a particular user by comparing captured image data against one or more existing images of that user. Another approach attempts to identify specific features of a person's head or face, and then use the locations of these features to determine a relative position of the user's head. For example, an example algorithm can analyze the images captured by the left camera and the right camera to attempt to locate specific features 234, 244 of a user's face, as illustrated in the example images 230, 240 of FIGS. 2(d) and 2(e). The relative location of the features, with respect to each other, in one image should match the relative location of the corresponding features in the other image to within an acceptable amount of deviation. These and/or other features can be used to determine one or more points or regions for head location and tracking purposes, such as a bounding box 232, 242 around the user's face or a point between the user's eyes in each image, which can be designated as the head location, among other such options. The disparity between the bounding boxes and/or designated head location in each image can thus represent the distance to the head as well, such that a location for the head can be determined in three dimensions.

In order for applications to be able to utilize head position data, however, the appropriate sensor data or image data must be obtained and analyzed in order to determine the position. This information then must be communicated in a way that is appropriate for those applications or clients.

Since there can be both native and non-native clients consuming this information, the information may need to be provided in multiple ways along multiple different channels. Further, there can be additional types of input or motion that may be desirable to be tracked over time as well, such as gestures performed by a user or motions of the computing device itself. Each of these types of input can have corresponding data provided by at least one motion sensor, which must be obtained, analyzed, and processed in order to be useful to the appropriate clients and/or applications. Various other manipulations and/or processing can be desirable to be performed on this data as well.

Accordingly, approaches in accordance with various embodiments provide architectures that can be used for input tracking, such as may be useful for head tracking or gesture input. These architectures can accept data from various hardware components of a computing device and process the data such that the data can be consumed by various types of client. The architectures can also provide various channels or methods by which those clients can consume the data.

Figure 3:
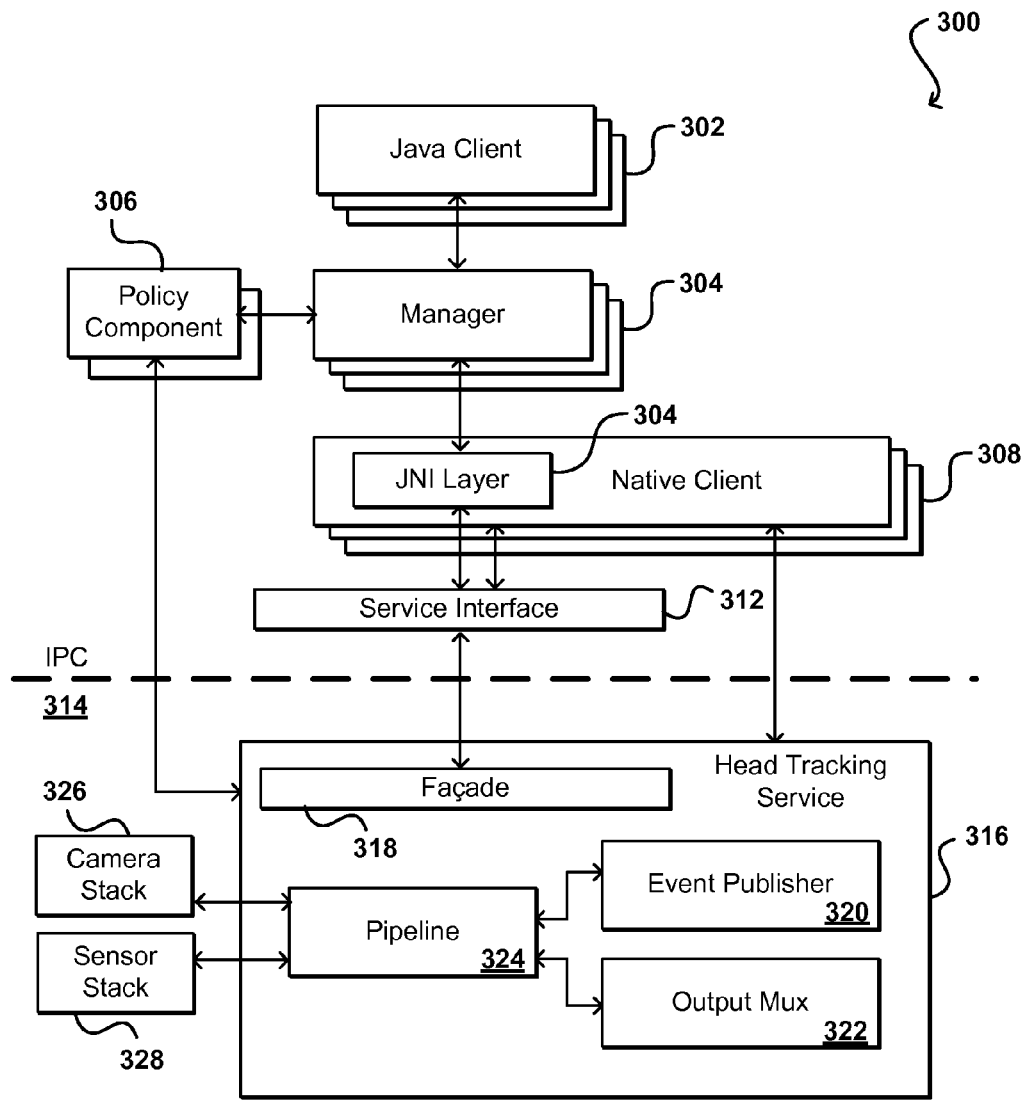
FIG. 3 illustrates an example service architecture that can be utilized in accordance with various embodiments.

For example, FIG. 3 illustrates an example architecture 300 that can be utilized in accordance with various embodiments. In this example, information from one or more hardware components, such as motion sensors or cameras, or sensor stacks can be received to a pipeline 324 of a tracking service 316. The motion sensors can include any of a number of different sensors, such as at least one motion sensor (e.g., gyroscope, accelerometer, inertial sensor, and/or electronic compass, etc.). The cameras can include any appropriate cameras, such as at least one front-facing camera, rear-facing camera, or gesture camera. The data can be supplied from the appropriate stack, such as from a camera stack 326 or sensor stack 328 and received to the pipeline 324. In many cases, the data received to the pipeline will be the raw data received from the sensor, which in the case of a camera can include the image data as well as metadata about the image, settings of the camera, etc. The information from the various sensors can be combined in the pipeline 324 and passed to one or more components, in this case an event publisher 320 and an output mux 322, which can function as listener managers where listeners can register with the tracking service. The event publisher 320 can analyze the data and enable that data to be published to, for example, "listener" clients 308 through at least one inter-process communication (IPC) layer 314, such as a binder layer. A listener client in at least one embodiment can be any appropriate client that has registered to receive events published by the service. The event publisher can publish events, such as updated head position or gesture information. The listener clients 308 can use this information to update various types of information, such as the way one or more interface elements are displayed, the selection of information to be conveyed to the user, and the like. The example implementation also includes an event provider, or "mux," 322, which can function like another event publisher to accept input signals from the pipeline and forward that information, after processing, to various "pull" clients, such as Java® clients 302, through polling or another such process. A pull client can be any appropriate client able to call (directly or indirectly) into the tracking service to obtain event data. The parallel processing components provide for updated data to be provided to different clients (or the same clients) through both push and pull approaches.

In this example, calls such as polling interface calls and publish interface calls can run through a designated interface layer, here designated a façade layer 318, and these calls can come through a corresponding service interface layer 312 on the client side of the IPC layer 314, among other such options. As illustrated in FIG. 3, native clients (such as clients provided by the same provider as the head tracking service, installed on the same device, or specific to a particular operating system platform) can, in at least some embodiments, can act as listener or pull clients, enabling them to call directly into the tracking service 316, which can take the form of one or more software packages in at least some embodiments, while in other embodiments at least some of the components and processes can be implemented at least partially through hardware. Non-native clients, such as clients implemented in Java, can function as listener or pull clients as well, although these clients may have to communicate through at least one additional interface layer, such as a Java Native Interface (JNI) layer 304, which enables the Java client to call into components such as the native clients and tracking service. The JNI can be used, for example, to account for the fact that the standard Java class libraries may not support the head tracking service-specific features or library, etc. Discussed in more detail elsewhere herein, the Java clients (or other, non-native clients) may also utilize various data managers, such as tracking managers, head tracking managers, and gesture managers, that are configured to listen for certain types of events and pass that data on to the non-native clients. The managers might also work with various policy components 306, such as policy services and service façades, to call into the head tracking service, such as to call into an override interface as discussed elsewhere herein. Examples of policies that can be implemented and/or utilized are discussed later herein.

Figure 4:
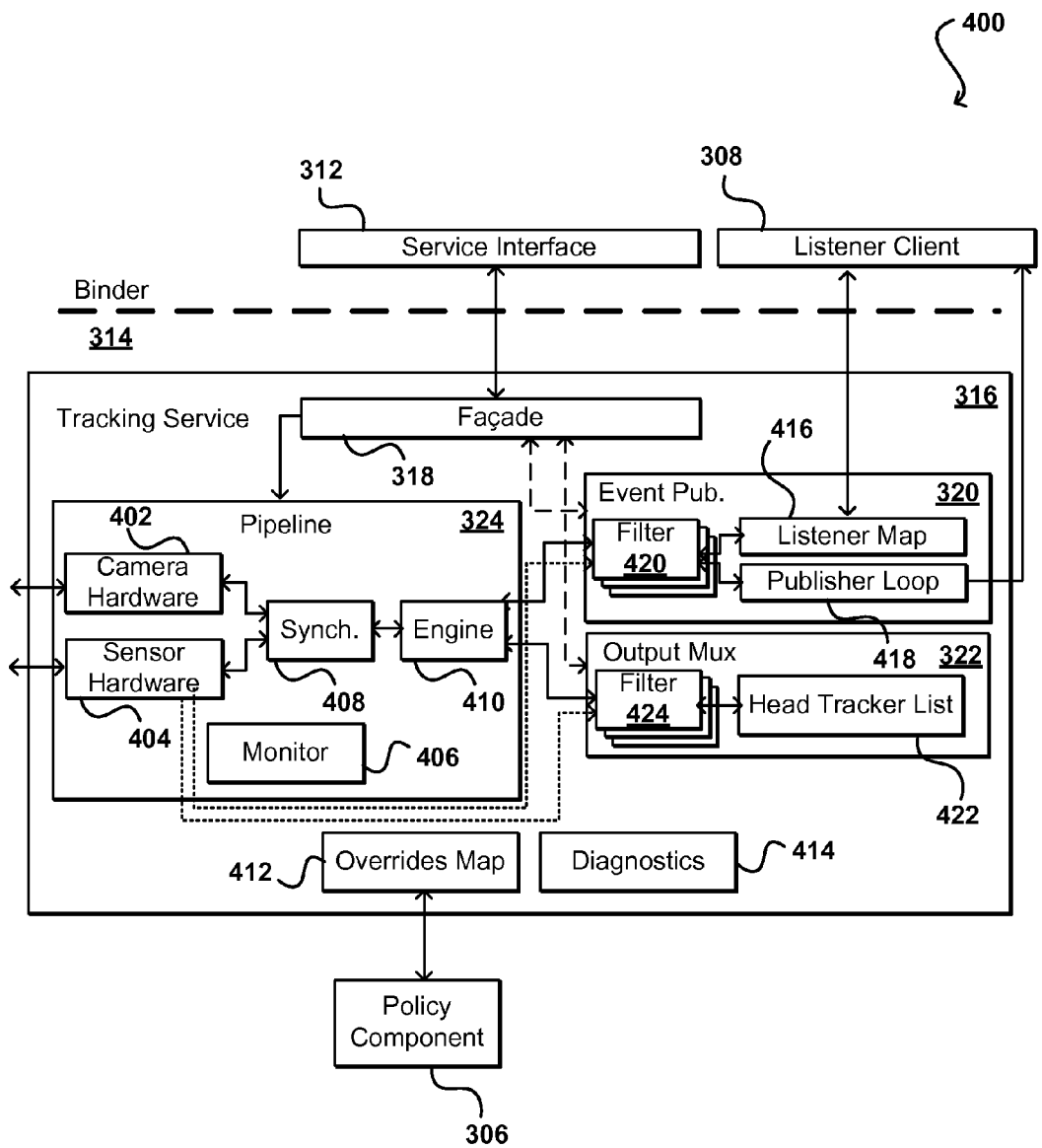
FIG. 4 illustrates components of an example head tracking service that can be utilized in accordance with various embodiments.

FIG. 4 illustrates a view of an example implementation 400 of a tracking service, such as that described with respect to FIG. 3. Reference numbers for similar elements are carried over between figures for ease of explanation, but it should be understood that this is merely done as a matter of convenience and not intended to be a limitation on the various embodiments. Further, for purposes of explanation the tracking service will be discussed primarily with respect to head tracking for purposes of explanation, but it should be understood that such a tracking system could additionally, or alternatively, provide data for gestures, peeks, and other such inputs as discussed and suggested elsewhere herein. In this example, the pipeline 324, which can be responsible for controlling the flow of data through at least a part of the tracking service, is shown to include a camera hardware interface 402 for interfacing with the native camera stack on the computing device, as well as a sensor hardware interface 404 for interfacing with the native sensor stack. As discussed, examples of motion sensors include gyroscopes, accelerometers, inertial sensors, magnetometers, and electronic compasses, among others. These components can accept the raw data from the respective devices, which can be fed to a synchronizer component 408. The synchronizer can create, or utilize, a buffer for the sensor data received between camera frames. The synchronizer can be advantageous for many devices as a camera will generally run at a frame rate such as thirty or sixty times per second, which may be significantly slower than the frequency at which motion sensor data will be received. Further, the data received from one or more cameras will generally be received at different times than data received from one or more motion sensors. The synchronizer can buffer the most recent motion sensor data (e.g., gyroscope data) until the next camera frame is received, using time stamps or other such data, and can package the newly received camera frame and the sensor data received since the previous camera frame (and potentially the previous camera frame as well in some embodiments) into a data object that can be passed to a data processing engine 410. The use of a synchronizer is advantageous for components such as the engine 410 that then do not need to deal with the asynchronous nature of the incoming data. Further details about the operation of such an engine are discussed below. The engine 410 can be a pluggable component, such that other engines can be plugged in or removed as needed.

A data processing engine 410 can accept the data object from the synchronizer 408 and attempt to perform one or more functions on the data in the data object, such as to locate and/or extract the head position from an image frame. For example, the engine in this example can attempt to perform face detection and feature extraction on the input camera images, using a process such as is discussed with respect to FIG. 2. In some embodiments, multiple engines might be available to process the data, as may be able to be specified by one or more of the clients. In some embodiments, multiple engines might process the data and the results analyzed or combined to attempt to improve overall accuracy. Each engine can take the form of a library used by the tracking service 316 in some embodiments. Upon detecting the face, head, and/or features, the engine 410 can package the data as, for example, "input" data, and forward the input data to one or more listeners implemented by the event publisher 320 and output mux 322. In some embodiments, the input data corresponds to coordinates in image/frame space where the face and feature points were detected, or in some embodiments can correspond to coordinates (e.g., x, y, z) of an object in real space. In some embodiments one or more updated camera and/or sensor settings can also be passed back through the respective interfaces, such as may instruct to activate or deactivate certain cameras or sensors, send specific types of data, adjust exposure or aperture settings, adjust illumination settings, and the like. In this example, the camera hardware interface 402 can be responsible for other tasks as well, such as preventing issues with bad threads, data cleansing, and data formatting. Such a component can also spawn a separate thread to monitor that frames are still being received by the service, and can push an error to the listeners if frames are not being received. The sensor hardware interface 404 can provide a wrapper interface around the sensor stack, and can also spawn a thread to poll the sensors for data to be pushed to the listeners. The component can detect errors or time out polling for data, and can push the errors to the appropriate listeners. In some embodiments an internal washer thread can perform tasks such as to close connections for the sensors and/or cameras.

The data from the pipeline 324 can be received to the event publisher 320, which can be tasked with publishing events to clients registered with the head tracking service 316, facilitating a push capability of the service. The event publisher 320 can maintain a list of different clients, and the interfaces for sending those clients events, as listener maps 416 for use in publishing the events. The data received from the pipeline can be filtered using one or more filter objects 420, such as may be used to process and/or smooth the head location data, with each filter providing different functionality and varied output. The filters can include, for example, sensor fusion filters, pass through filters, finite impulse response (FIR) filters, and fixed filters, which can output fixed path or fixed position data. An example filter can obtain the input data (e.g., raw position data for the head in image space and the head position) from the engine, and can attempt to smooth or otherwise process the data to output coordinates of the head position to be passed to the clients. Filters such as sensor fusion filters can combine data from disparate sources, here the hardware interfaces and the engine, in order to provide data that is likely to be more accurate and less likely to include spurious data or significant amounts of noise than data from any of the sources individually. A FIR filter has a response to any finite length input of finite duration, settling to zero in finite time, and thus can provide for data smoothing with no need for feedback in a way that is inherently stable. Various other filters can be used for data smoothing, noise removal and other such purposes as well within the scope of the various embodiments. In this example, the event publisher has at least two types of listeners, including raw listeners that get the data immediately from the sensor hardware 404 and camera hardware 402, as well as head tracking listeners that get data at a constant rate, which can correspond to the frame rate of the camera in some embodiments, independent of the camera frame and/or processing times. The processed data can be published to the listener clients 308 and/or listeners as events in at least some embodiments using a publisher loop component 418. The published events can include, for example, data for a head tracking event (a location of a head detected, as may include inclination angle), a raw data event, or a camera frame event. In at least some embodiments, the publisher loop can sample the appropriate filter 420, obtain the most recently updated head position values, and publish those values to any client or component registered for listening events.

As mentioned, the tracking output mux 322 can perform similar functions as the event publisher 320, but facilitates polling and/or sampling of the data instead of event pushing or publishing. The mux component can maintain the lists of head tracker handles and their different configurations, and can use the same selection of filters as the event publisher in at least some embodiments. The sample call for the head tracking event can be made on the output mux. The filters can be updated with the output from the pipeline 324 when received, which the can be sampled to return the head tracking event. These events can be similar to the types of events discussed with respect to the event publisher. As with the event publisher, the filters 424 can receive processed input (e.g., head position coordinates in image space) from the engine 410 and raw data from the hardware interfaces 402, 404 in order to fuse and/or filter the data as desired. In at least some embodiments a filter selection mechanism can be exposed that can enable a client to select the filter(s) to be applied for an event. A filter can use the head tracking data and raw sensor data to determine a final head position determination that can be provided to the appropriate client(s). By enabling sampling on the service through the output mux and providing a sampling method on the filters, a client can obtain the most recent head position each time a sample call is instructed.

The example tracking service 316 takes advantage of various other components as well. For example, the policy components 306 discussed previously can include a policy service that can interact with native services such as a power manager service or window manager service to obtain the state of the device and send relevant commands based upon a determined state of the user's head with respect to the device, as may be determined using the provided event data. For example, if it is determined that a user has not glanced at the device for a period of time the policy service might, according to a specified policy, cause a camera or sensor to power down or enter a standby state. If a head has not been detected for a period of time, then a display screen of the device might be placed in a standby state. The policy components can interact with the head tracking service in at least some embodiments using one or more Java APIs, and can take advantage of one or more overrides maps 412 to maintain information for the various hardware components. As illustrated the service also takes advantage of an IPC interface 314, such as a standard Android® binder layer, which can be a system-wide service that provides for inter-process communication between the head tracking service 316 and the clients 308 and/or service interface 312. One or more diagnostic modules 414 also can be used to attempt to determine problems with the head tracking service.

The service can also utilize at least one monitor 406 or "watchdog" component that can be tasked with determining when any of the hardware stacks of the device are not sending data, or at least valid data. The monitor in such cases can be charged with getting the data flowing and/or restarting the corresponding components, among other such options. In one example, a time window is used to determine how long it has been since data was received from a specified component interface. If data has not been received for more than that window of time, or if data was received but determined to not be valid, the monitor can attempt to determine the type of error and take an appropriate remedial action. A "hard" error can be determined to have occurred when a hardware component has failed in a way that is not recoverable, at least by the monitor component, and a "soft" error can be determined to have occurred when data has been provided but is erroneous. The monitor component can attempt to recover from soft errors, such as by disconnecting and reconnecting to attempt to reset the interface. After a restart or other such action, any or all registered listener clients can automatically have a reconnect performed such that the clients are not able to determine that a failure occurred. In some embodiments, the clients are automatically registered with the newly instantiated service. Data from other components can still be received and processed, and the pipeline can continue to stream data. For hard errors, the monitor can attempt to instruct a component, tracking service, and/or device restart. As an example, a soft error for a camera might be detected by a frame being delivered but the metadata being determined to be incorrect, such as by having invalid data for an exposure setting, etc.). Such a monitor can have access to data about the state of the system and information needed for various restarts. In at least some embodiments, the monitor 406 is in communication with at least the sensor hardware 404, camera hardware 402, and engine 410, functioning inside of, but not a part of, the pipeline 324. As illustrated, the façade 318 is able to call into the pipeline 324, such as to perform a pipeline switch that can activate, or deactivate, the head tracking service, and in at least some embodiments can control the hardware state as well. The pipeline switch in at least some embodiments can be controlled at least in part by the policy component 306. A monitor component (the same or a different monitor component) can also monitor for client status, and can remove information for a client from the listener map in the event that a client is no longer registered or available. If no clients are actively listening for data or polling data, the monitor component can cause various sensors to deactivate or enter a low power state in order to conserve resources.

Figure 5A:
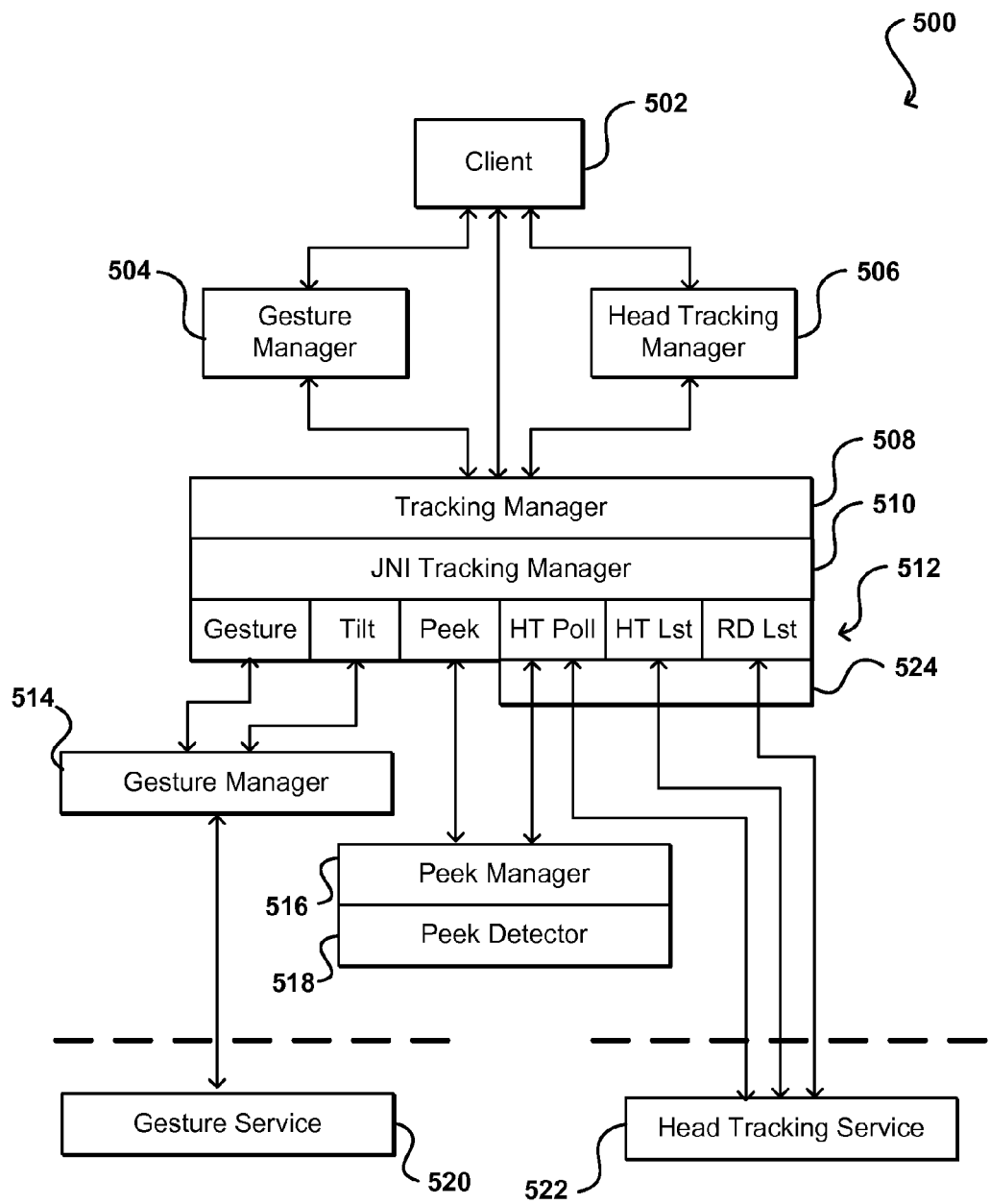
FIGS. 5(a) and 5(b) illustrate examples of a client architecture that can utilize a tracking service in accordance with various embodiments.
Figure 5B:
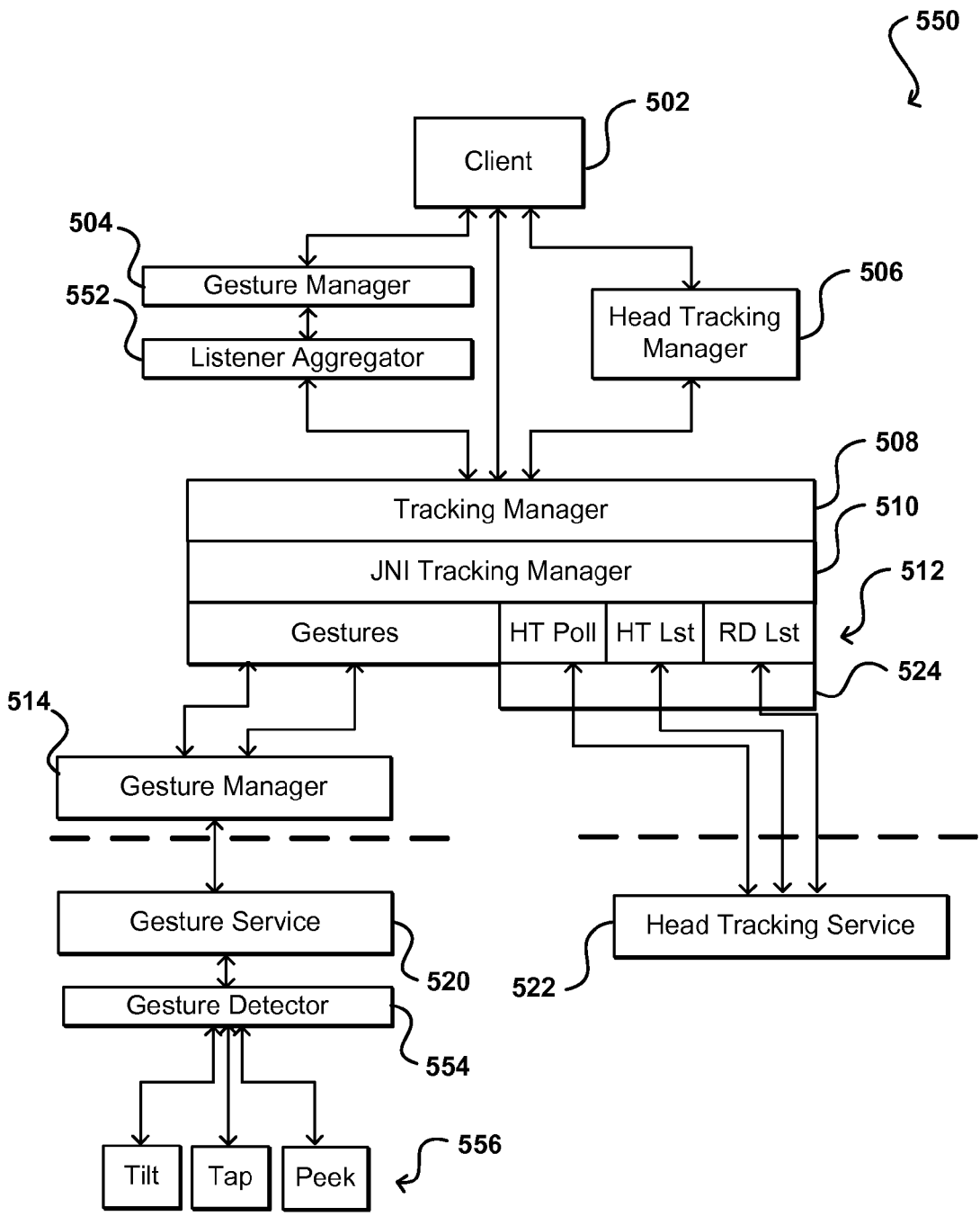

FIGS. 5(*a*) and 5(*b*) illustrate architectures 500 that can be configured to enable clients, such as Java clients, to leverage a tracking service in accordance with various embodiments. In this example, the architecture can be configured to receive data from a gesture service 520 and/or a head tracking service 522, with both having push and/or poll data available within the scope of various embodiments. As discussed, in some embodiments the data can alternatively be provided by the same service. The gesture service 520 can work similar to the head tracking service discussed previously, except that in this example the gesture service is a single process running on the computing device that analyzes sensor data, and potentially camera data in some embodiments, to determine input gestures such as a tilting of a computing device or a tap on the computing device. Gestures as used herein can be considered to include any input, typically a motion, from a user that signifies an intention, such as a tilt, swivel, peek, or double tap, among other such options. In some embodiments, gestures can be determined by analyzing and/or comparing several events that occur over time. In such instances, the gesture service 520 may provide data about device motion, for example, but the motion over time may need to be analyzed to determine a specific gesture, such as where a tap or tilt might need to have data for multiple motions determined before determining that the motion corresponded to a tilt or tap, such as where certain thresholds or ranges must be satisfied to confirm the gesture. Similarly, the motions might need to be analyzed to determine whether a motion is part of a tilt versus a peek.

In this example there is a separate peek detector 518 and peek manager 516 for managing peek gestures, which in some embodiments refer to specific small-angle tilt gestures or other such motions, but in other embodiments the peek functionality can be contained within the gesture service and gesture-related components. Further examples of peek gestures and peek gesture determinations are discussed later herein. The gesture service 520 can also register with sensors or other hardware components as necessary, depending at least in part upon the types of gestures to be monitored, tracked, or detected. A gesture manager 514 is a listener manager with which any of a set of listeners 512, here the gesture and tilt listeners, can register. As mentioned, the peek listener can register with the gesture manager as well in some embodiments. The gesture manager 514 that sits between the gesture service 520 and the set of listeners 512 is an internal listener manager, and a public gesture manager 504 can be used that sits between the client 502 and the tracking manager 508, which in turn sits on top of the JNI manager for passing data from the various listeners 512 of the listener layer. The internal gesture manager can function as another binding layer, linking external APIs and the gesture service 520 in at least some embodiments. The gesture manager in either instance can register as a listener to receive events from the gesture service 520, either directly or through the JNI tracking manager. In this architecture the tracking manager 508 can handle data for peeks, gestures, and head tracking events, among others. The internal gesture manager 514 can figure out which of the listeners 512 should receive the data for any event received from the gesture service.

Similar flow occurs for events received, or pulled, from the head tracking service 522. The tracking manager 508 again serves as an intermediary layer between the service 522 and the client. The head tracking data can be passed to the appropriate listener(s) of the set of listeners 512, such as a head tracking data poller, a head tracking data listener, and/or a raw data listener. As illustrated and discussed previously, the data can pass through a native binding layer 524 in at least some embodiments. The poller can attempt to sample the service, using binder calls discussed previously, while the listeners can receive published events. From the listeners, the data can be passed through the JNI tracking manager 510 and tracking manager 508 to be passed to the public head tracking manager 506, which then can provide the data to the client. The managers can enable the handling of different modes, such that in a standby mode the data might still be received but not used for computations, etc. Similarly functionality can be implemented in the head tracking service, in order to save some power and processing without having to power down and restart any of the hardware. Further, such an approach enables resuming of calculations with little delay. The managers can also enables the clients to request data at different fidelities. For example, a client can cause a camera to operate at a lower frame rate, which can provide for less accurate tracking but can also conserve power where lower accuracy is acceptable. Clients needing high fidelity data can also cause additional processing to be performed in the head tracking and/or gesture services, such as by using additional filters or engines to process the data, or by further utilizing the raw data from the sensors, such as by sampling the filters at a rate greater than the frame rate of the camera.

In the example architecture 550 of FIG. 5(*b*), the gesture components, including components for tap, tilt, peek, and other such gestures, have been consolidated inside the gesture components. In this example, a gesture listener aggregator 552 component is added to ensure that all appropriate gesture event data is passed to the gesture manager 504 in an appropriate manner. The gesture data can still flow between the gesture manager 514 and gesture service 520 components, but can be provided by a common gesture detector 554 that can listen for, or otherwise receive gesture data from, components such as listeners 556 for tilt, tap, peek, and other such gestures. Such an approach can allow for a single gesture component or service to be active on a device, instead of one or more components for each gesture operating for each respective client.

Figure 6:
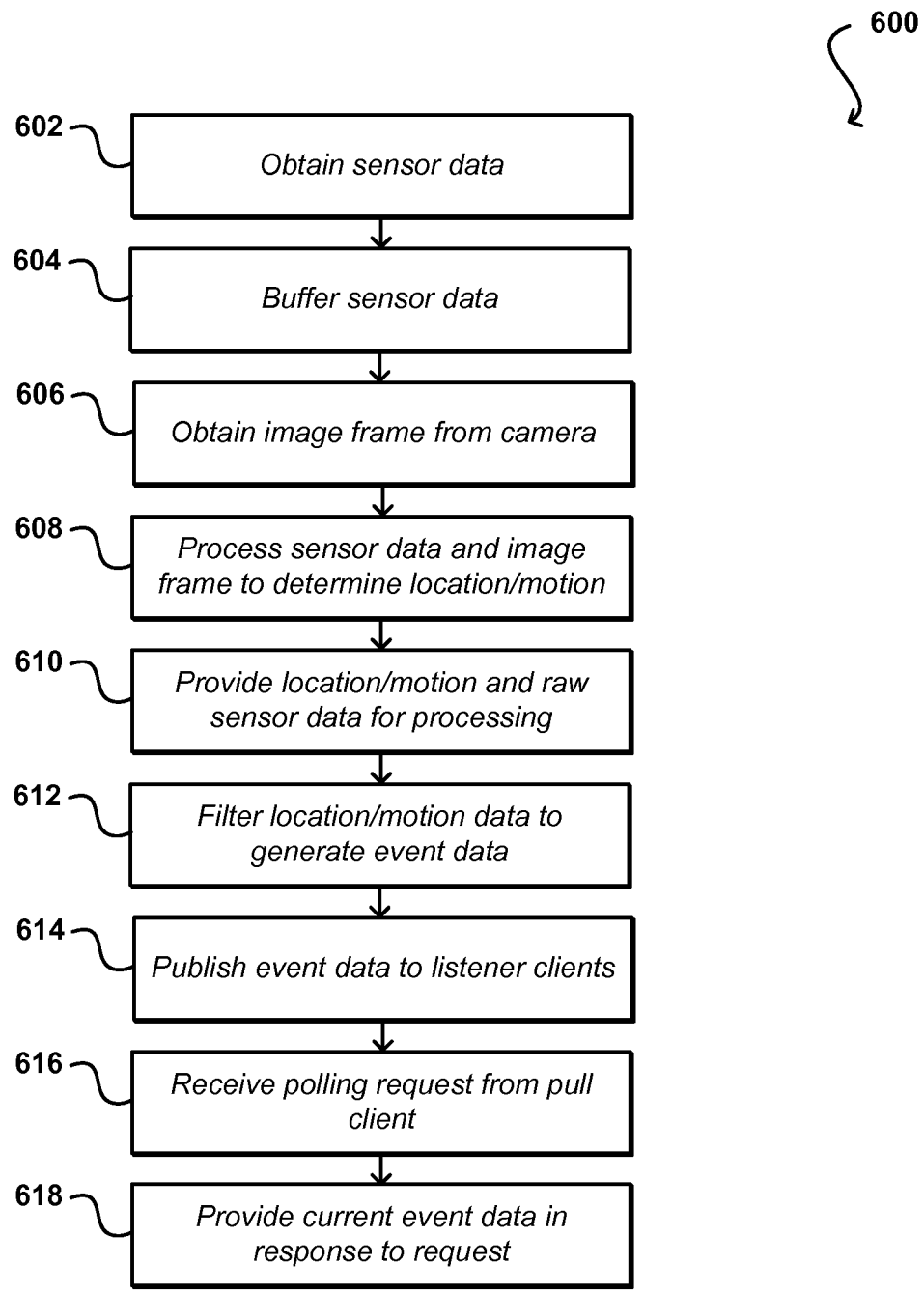
FIG. 6 illustrates an example process for enabling a client to obtain tracking data that can be utilized in accordance with various embodiments.

FIG. 6 illustrates an example process 600 for providing tracking data to a client that can be utilized in accordance with various embodiments. It should be understood that there can be additional, fewer, or alternative steps performed in similar or alternative orders, or in parallel, within the scope of the various embodiments unless otherwise stated. In this example, sensor data is obtained 602 from the motion sensors and/or sensor stack. As discussed, this can include data from sensors such as gyroscopes, inertial sensor, and accelerometers, among others. Since sensor data will generally be received asynchronously from, and more frequently than, the camera data, a component such as a synchronizer can buffer 604 the sensor data as it is received. In at least some embodiments, the synchronizer can also mark timing information for each instance of sensor data to assist with synchronization and/or data processing. When data for an image frame is subsequently obtained 606, the synchronizer or other such component can bundle the image frame data and sensor data and pass that data to at least one engine or other such component. The sensor data and image frame data can be processed 608 to determine location and/or motion data, such as by locating features in the image frame and determining a head location in image space, or by analyzing gyroscope data to determine an amount and direction of device rotation. The location/motion and raw sensor data can then be provided 610 for processing, such as by an event publisher and an output mux as discussed herein. In this example, the processing can include filtering 612, using one or more filters, the location and/or motion from the engine to generate a set of event data (e.g., head coordinates or device rotation vectors) as the output of the tracking service. The event data can be published 614 to any listener clients, or other such components, that have registered to receive specific tracking events. For another client, such as a pull client, a polling call can be received 616 for the most recently updated event data. The current event data can then be provided 618 in response to the request. As mentioned, the data may have to pass through a JNI or other such layer before being able to be processed by a non-native client in at least some embodiments.

As mentioned, an engine in a pipeline can utilize various algorithms and approaches for detecting objects using image and/or sensor data. In particular, various embodiments involve detecting and tracking a portion of a user, such as the head or contours of the face of the user. In particular, various approaches enable a primary user to be identified and tracked using stereo association and multiple tracking algorithms. For example, a face detection algorithm can be run on each image captured by a respective camera independently. Upon detecting a face, a face detection algorithm can independently analyze images from the respective camera to match faces between all cameras. If the faces are matched a face pair is created and used as the first data point in memory for initializing object tracking. If, however, a face was only detected in only one of the cameras, a matching algorithm can analyze the frame missing the face using a template of the face from the other frame in an attempt to recover the missing face. Once the missing face is recovered and the faces are matched, object tracking can be initiated. Additionally, if more than one face is detected in the images, a primary face or user to track can be determined using depth information, distance to center, face size, and the like, as will be explained in more detail below. Accordingly, once the face pair is identified, object tracking can begin and the face pair is stored in memory.

Once a face pair is identified, a subsequent frame from each of the cameras can be analyzed to detect the primary user's face from image frame to frame (e.g., tracking-by-detection). Some tracking algorithms are designed to track a face only when it is detected in a previous frame. Placing such a limitation, however, could render the method inoperable in some instances where an object is not recognized in a particular frame for a variety of reasons, such as lighting, view angle, and the like. Therefore, in order to expand the advantages of a tracking-by-detection method over a wider range of situations, a second tracking algorithm, such as a Median Flow Tracker (MFT), can be used when the face pair is not detected in at least one of the current image frames. Then, in a subsequent frame, the process of attempting to detect the face pair can resume. Therefore, if the face pair is detected in a previous frame, tracking-by-detection is performed. If the face pair is not detected in the previous frame, the second tracking algorithm is used.

Further, once the location of a respective bounding box is determined, features of a user's face within the bounding box can be extracted for each captured frame to determine the location of a user's eyes and mouth, for example. The change in position of these features between subsequent image frames can be used to determine what feature tracking method is used for that particular frame in order to reduce jitteriness and provide a smoother tracking output. For example, the change in optical flow of a user's eyes can be calculated for a current and previous image frame pair. In one example, if this change is less than a first amount or threshold, then the position of the user has only slightly changed relative to their position in the previous frame. Since this change is small, the current position of the user's eyes can be reasonable estimated as their location in the previous frame, as if the user hasn't moved. In another example, if this change is between the first threshold and a second threshold, a single point tracking algorithm can be used to track the user's eyes between these two frames in order to reduce jitteriness. If, however, this change in optical flow is greater than the second threshold, the current position of the user's eyes can be used. In this instance, the tracking output will appear quite jittery, however, since the change in eye position is so great (i.e., greater than the second threshold) the user has moved quickly or abruptly and, thus, an abrupt change, in this instance, would not only be acceptable, it would likely be expected.

Various embodiments enable a user to control a computing device based at least in part upon the relative position of a user with respect to a computing device angle, such as a relative and/or orientation of the user, a direction of the viewing angle of the user, or the angle of the user's head relative to the computing device (e.g., the angle of incidence or a derivation thereof formed by a ray from a point corresponding to the user (e.g., a point between the user's eyes) to a point corresponding to the computing device (e.g., center point of the front surface of the computing device)), among other relative position information. For example, a first view of content may be presented to a user via a display element of the computing device. There may be additional content, contextual information, or other information that is not immediately presented on the display element, such as due to the space limitations of the display element. However, the computing device may enable the user to "peek," "scroll," or perform another movement to change the angle of the user's head relative to the device to view the associated content, such as by tilting the device from a resting position in a leftward (e.g., eastward), rightward (e.g., westward), upward (e.g., northward), downward (e.g., southward), intercardinal or ordinal (i.e., northeast (NE), southeast (SE), southwest (SW), northwest (NW)), and/or secondary-intercardinal direction (e.g., NNE, ENE, ESE, etc.), among other possible movements. Alternatively, or in addition, the user may tilt his head in one or more of the aforementioned directions, which can be recognized as input for the computing device to cause the device to perform the desired action.

In various embodiments, the actual movement of the user's head and/or the apparent movement of the user's head due to movement of the device can be detected by one or more cameras and/or one or more motion/orientation elements (e.g., accelerometer, gyroscope, digital compass, etc.) to control various functions of the device. Such an approach can reduce the use of a touch-sensitive element (e.g., resistive, capacitive, surface acoustic wave, or infrared touchscreen, etc.) of the device, and decrease fingerprints, dirt, smudges, and other remnants that may otherwise be left on the touch-sensitive element. This can reduce or eliminate the amount of glare or other issues with clarity and/or visibility. Further, control of a computing device based on head gestures or the actual or apparent movement of the user's head can be more immediately responsive of the user's intent than conventional approaches such as those requiring the user to swipe a touchscreen or push virtual buttons. In addition, control based on the angle of the user's head with respect to a computing device can enable one-handed operation or hands-free operation, which can be advantageous when the user is operating another computing device (e.g., desktop or laptop computer).

Approaches in accordance with various embodiments enable a relative position of the user, such as the angle of the user's head or the actual and/or apparent movement of the user's head with respect to a computing device, to be recognized as input for the computing device even when the user is positioned "off-axis" or not orthogonal and/or not centered with respect to the computing device. In various embodiments, an elastic "reference point" or "reference angle" can be used for adjusting the determination of how far the user's head has moved with respect to a computing device for controlling the device. As used herein, the "reference point" or "reference angle" is an estimate of the angle of the user's head in his natural resting position. The reference point or reference angle is determined based on an elastic function of relative position information and previous values of the reference point over time. In an embodiment, the elastic function includes weighting a difference or delta between the detected head angle and the previous value of the reference point by an elastic factor such that the reference point and the head angle converge within a specified period of time. For example, the larger the difference between a previous reference point and the detected angle of the user's head, the faster the currently determined reference point converges with the detected angle. In conjunction with the elastic reference point, a "neutral region" can be defined based on the reference point. As used herein, the "neutral region" is a fixed area around the reference point or a specified range from the reference point in which the reference point is allowed to move. That is, the reference point is bound within the limits of the neutral region, and the reference point is continuously updated when the detected angle of the user's head is within the neutral region. This dynamic adjustment of the reference point or reference angle allows the user to operate a computing device off-axis and enables the device to continue detecting changes in angle of the user's head with respect to the device for controlling the device. Such an approach can account for differences between when the user is changing his natural resting position and/or the resting position of the device and when the user is intending to control the device based on the angle of the user's head relative to the device.

In various embodiments, approaches can look at head position or the location of various facial features to determine whether at least one user is likely looking substantially at, or away from, the display element. In another embodiment, the algorithm may further determine, based on the gaze direction and the field of view of the user's eyes with respect to the display element and/or imaging element, where the user is looking with respect to the display element, such as at a particular icon or even focused about a particular pixel or other display element. By tracking changes in the field of view/relative position of the user's eyes, the algorithm can determine at any time whether the user is looking at the device and, if so, where on the device the user is looking.

The functionality of a device can be altered based at least in part on the determined field of view, viewing position of the user, a change in gaze direction, etc. The way in which the functionality is modified can be determined based at least in part upon one or more policies. Per some example policies, a display element can have different brightness values applied, or even shut off, based at least in part upon whether the user is looking at, toward or away from the display element and/or device, or based at least in part upon the relative head position of the user. That is, in such embodiments, the imaging element is used to provide input to control other aspects of the device.

In other embodiments, various functionality or inputs of a device can be enabled/disabled, turned off or otherwise modified based at least in part upon the determined gaze direction or head position of the user, based upon one or more policies. For example, if it is determined that a user is not looking at the display element of the device but attempting to type a message using a touch-sensitive display element keyboard, instead of a conventional keyboard, the keyboard inputs may be modified to improve the user's typing ability. For example, the device may audibly present each key when selected by the user. In another example, the device may audibly present each key as the user positions their finger over/on the key prior to selection. In addition to audible presentation of key selections, the device may shut off the display element to conserve power.

Any number of device features and/or inputs may be controlled using policies in accordance with the various embodiments described herein. For example, if it is determined that the user's gaze direction is not toward the device, or that the imaging element did not capture an image that includes the user's face, the device may disable inputs such as one-touch dialing in order to prevent inadvertent selection of such an input. In at least some embodiments, the user can configure which functions are enabled/disabled as well as define which functions require the user to at least look at the display element while performing certain actions.

Figure 7:
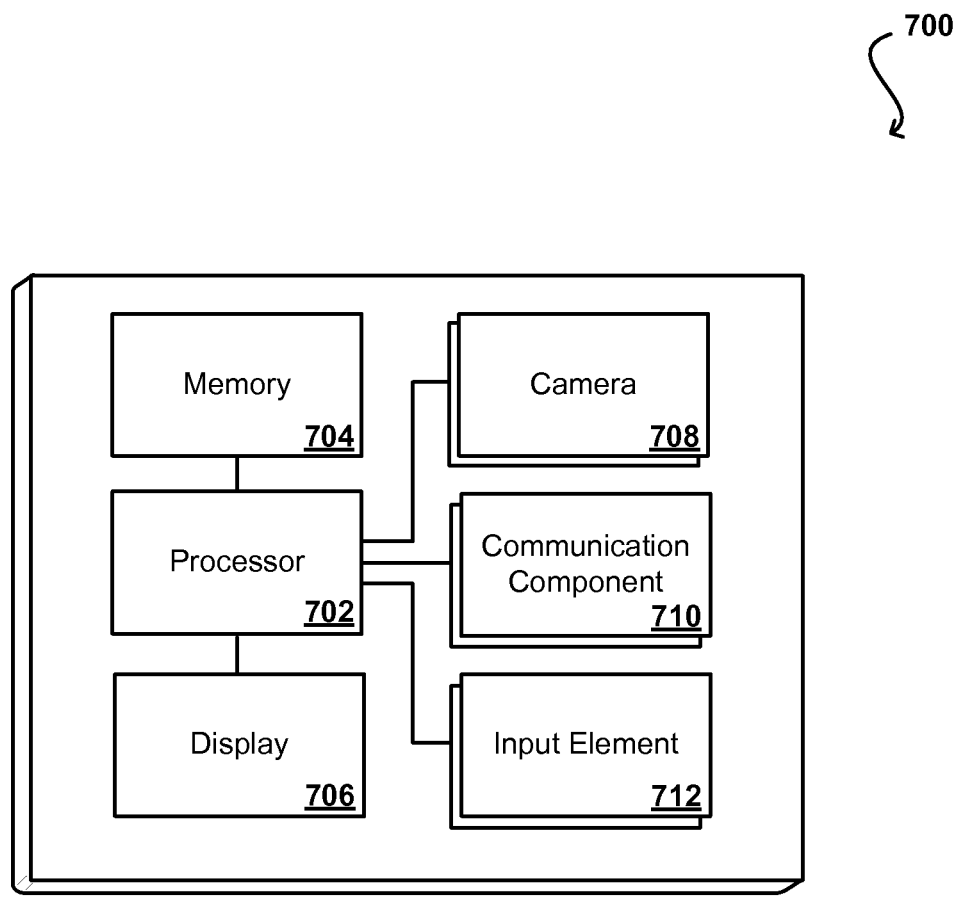
FIG. 7 illustrates example components of a client device that can be utilized with various embodiments.

FIG. 7 illustrates a logical arrangement of a set of general components of an example computing device 700 such as the device 100 described with respect to FIG. 1A. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one camera 1008 that is able to capture images or video of one or more objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can include at least one mono or stereo microphone or microphone array, operable to capture audio information from at least one primary direction. A microphone can be a uni- or omni-directional microphone as known for such devices.

In some embodiments, the computing device 700 of FIG. 7 can include one or more communication components 710, such as a Wi-Fi, Bluetooth, RF, wired, or wireless communication system. The device in many embodiments can communicate with a network, such as the Internet, and may be able to communicate with other such devices. In some embodiments the device can include at least one additional input element 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device also can include at least one orientation or motion sensor. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor, whereby the device can perform any of a number of actions described or suggested herein.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and non-transitory computer-readable media for containing code, or portions of code, can include any appropriate media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   memory including instructions that, when executed by the at least one processor that when executed provide:
   a second hardware interface, of a plurality of hardware interfaces, the second hardware interface configured to accept image data from a camera, the image data indicating at least location of a head, the image data provided at a first rate;
   a first hardware interface, of the plurality of hardware interfaces, the first hardware interface configured to accept motion data from a motion sensor, the motion data indicating at least motion of the computing device, the motion data provided at a second rate that is faster than the first rate;
   a synchronizer configured to:
   receive and store the motion data;
   receive the image data; and
   generate a data object that represents synchronized image and motion data, the data object based at least in part on motion data generated during a first time period and image data generated at an end of the first time period;
   an engine for processing the data object to generate input data corresponding to at least the location of the head and the motion of the computing device;
   an inter-process communication layer;
   an event publisher configured to filter the input data to produce first filtered input data and publish, using at least the inter-process communication layer, the first filtered input data as first event data to a listener client executing on the computing device, the listener client registered to receive the first event data; and
   an event provider configured to filter the input data to produce second filtered input data and provide, using at least the inter-process communication layer, the second filtered input data as second event data in response to a polling request from a pull client executing on the computing device,
   wherein the listener client and the pull client are enabled to determine at least one of a change in head position or a gesture based at least in part upon at least one of the first event data or the second event data.

2. The computing device of claim 1, wherein the instructions when executed further cause the computing device to provide:
   a policy manager component configured to adjust operation of the computing device according to at least one policy, wherein the plurality of hardware interfaces, the synchronizer, and the engine are part of a data pipeline, and
   wherein the policy manager component is configured to selectively activate the data pipeline in accordance with the at least one policy.

3. The computing device of claim 1, wherein the instructions when executed further cause the computing device to provide:
at least one interface layer configured to receive the polling request from the pull client, the interface layer configured to provide the second event data, the at least one interface layer further configured to send the second event data to the pull client in response to the polling request.

4. The computing device of claim 1, further comprising:
at least one first filter in the event publisher configured to receive first data from at least one hardware interface of the plurality of hardware interfaces and the input data from the engine; and
at least one second filter in the event provider configured to receive second data from at least one hardware interface of the plurality of hardware interfaces and the input data from the engine,
wherein the at least one first filter and the at least one second filter are each configured to smooth the input data from the engine based at least in part upon at least one of the first data or the second data.

5. A computer-implemented method, comprising:
receiving motion sensor data indicating at least a motion of a computing device through a first hardware interface of the computing device, the motion sensor data being acquired during a first time period and at a first rate using at least one motion sensor of the computing device;
storing the motion sensor data to a storage component;
receiving image data indicating at least a location of a head through a second hardware interface of the computing device, the image data being acquired at an end of the first time period and at a second rate using a camera of the computing device, the second rate being slower than the first rate;
retrieving the motion sensor data from the storage component;
generating synchronized input data by processing, using at least one processor of the computing device, the image data and the motion sensor data, the synchronized input data including at least locations of feature points of the head and motion as represented by the motion sensor data;
transmitting the synchronized input data to a publisher component;
transmitting the synchronized input data to a polling component;
causing, using the publisher component and at least an inter-process communication layer, the synchronized input data to be available as first event data to at least one listener client, the at least one listener client registered to receive the first event data; and
providing, in response to a polling request from a pull client and using the polling component and at least the inter-process communication layer, second event data based at least in part on the synchronized input data.

6. The computer-implemented method of claim 5, further comprising:
storing the motion sensor data to a synchronizer component
storing time information indicating a time of receipt of the motion sensor data;
receiving the image data; and
transmitting the motion sensor data, with the time information, and the image data to an engine to generate the synchronized input data.

7. The computer-implemented method of claim 5, further comprising:
processing the synchronized input data using at least one first filter and the motion sensor data to smooth the synchronized input data to be used to generate the first event data; and
processing the synchronized input data using at least one second filter and the image data to smooth the synchronized input data to be used to generate the first event data.

8. The computer-implemented method of claim 7, further comprising:
filtering at least one of the synchronized input data or the motion sensor data using at least one of a motion adaptive fusion filter, a pass-through filter, a finite impulse response (FIR) filter, or a fixed filter.

9. The computer-implemented method of claim 5, further comprising:
determining at least one of a change in head position or a gesture based at least in part upon at least one of the first event data or the second event data.

10. The computer-implemented method of claim 5, further comprising:
analyzing, using the publishing component, at least one listener map to determine the at least one listener client to which to provide the first event data, the at least one listener map further including interface information for the at least one listener client.

11. The computer-implemented method of claim 5, further comprising:
determining, based at least in part upon the motion sensor data, that a determined motion sensor of the at least one motion sensor is in an error state; and
restarting the determined motion sensor in response to being in an error state,
wherein the processing of the image data and the motion sensor data continues while the determined motion sensor is restarting.

12. The computer-implemented method of claim 5, further comprising:
determining, based at least in part upon metadata received with the image data, that the camera is in an error state; and
resetting the second hardware interface in response to the camera being in an error state.

13. The computer-implemented method of claim 5, further comprising:
causing the second event data, provided in response to the polling request, to be passed through at least one interface layer and the inter-process communication layer, the second event data further capable of being passed through at least one language interface component for modifying the second event data to be received by the pull client.

14. The computer-implemented method of claim 5, further comprising:
registering, as a listener, at least one data manager component configured to listen for a specific type of at least one of the first event data or the second event data.

15. The computer-implemented method of claim 14, further comprising:
communicating with a policy service to determine how to process a request received from at least one of a listener client, a pull client, or a data manager.

16. A computing device, comprising:
at least one processor;
memory including instructions that, when executed by the at least one processor, cause the computing device to:
  receive motion sensor data indicating at least a motion of the computing device through a first hardware interface of the computing device, the motion sensor data being acquired during a first time period and at a first rate using at least one motion sensor of the computing device;
  store the motion sensor data to a storage component;
  receive image data indicating at least a location of a head through a second hardware interface of the computing device, the image data being acquired at an end of the first time period and at a second rate using a camera of the computing device, the second rate being slower than the first rate;
  retrieve the motion sensor data from the storage component;
  generate synchronized input data by processing, using the at least one processor of the computing device, the image data and the motion sensor data, the synchronized input data including at least locations of feature points of the head and motion as represented by the motion sensor data;
  provide, to at least one listener client and using an inter-process communication layer, the synchronized input data as first event data, the at least one listener client registered to receive the first event data; and
  provide, in response to a polling request from a pull client and using the inter-process communication layer, the synchronized input data as second event data.

17. The computing device of claim 16, wherein the instructions when executed further cause the computing device to:
  store the motion sensor data to a synchronizer component;
  store time information indicating a time of receipt of the motion sensor data;
  receive the image data; and
  transmit the motion sensor data, with the time information, and the image data to an engine to generate the synchronized input data.

18. The computing device of claim 16, wherein the instructions when executed further cause the computing device to:
  analyze the image data and the motion sensor data using at least one monitoring component to determine that at least one motion sensor or camera is in an error state, the at least one monitoring component configured to attempt to cause the at least one motion sensor or camera to move out of the error state.

19. The computing device of claim 16, wherein the at least one motion sensor includes at least one of a gyroscope, an accelerometer, an inertial sensor, or an electronic compass.

20. The computing device of claim 16, wherein the instructions when executed further cause the computing device to:
  process the synchronized input data to generate at least one of the first event data or the second event data, the synchronized input data being processed to smooth the synchronized input data based at least in part upon the motion sensor data received through the first hardware interface, the synchronized input data being processed using at least one of a motion adaptive fusion filter, a pass-through filter, a finite impulse response (FIR) filter, or a fixed filter.

21. The computing device of claim 1, wherein the inter-process communication layer is an ANDROID binder layer.

* * * * *